(12) United States Patent
Huang

(10) Patent No.: US 8,029,304 B1
(45) Date of Patent: Oct. 4, 2011

(54) PORTABLE STORAGE DEVICE

(75) Inventor: Chia-Chia Huang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 0 days.

(21) Appl. No.: 12/941,079

(22) Filed: Nov. 7, 2010

(30) Foreign Application Priority Data

Jun. 15, 2010 (TW) .................................. 099119366

(51) Int. Cl.
*H01R 27/00* (2006.01)
(52) U.S. Cl. ........................................................ 439/218
(58) Field of Classification Search ............... 39/218, 39/638, 660, 528, 38, 39, 40, 650, 651
See application file for complete search history.

(56) References Cited

U.S. PATENT DOCUMENTS

| 4,480,287 | A  | * | 10/1984 | Jensen     | 361/707 |
| 6,804,749 | B2 | * | 10/2004 | Chien et al. | 711/115 |
| 7,172,428 | B2 | * | 2/2007  | Huang      | 439/11  |
| 7,591,673 | B2 | * | 9/2009  | Chan et al. | 439/502 |

* cited by examiner

*Primary Examiner* — Tulsidas C Patel
*Assistant Examiner* — Phuong Nguyen
(74) *Attorney, Agent, or Firm* — Altis Law Group, Inc.

(57) ABSTRACT

A portable storage device comprises a main body, a first connector electrically coupled to the main body and a second connector electrically coupled to the main body. The first connector and the second connector are respectively capable of connecting to an electronic device. The main body is capable of storing data transmitted from one electronic device to another. Thus, data can be transmitted among different electronic devices.

4 Claims, 2 Drawing Sheets

PORTABLE STORAGE DEVICE

BACKGROUND

1. Technical Field

The present disclosure relates to a portable storage device, and more particularly to a portable storage device transmitting data among different electronics devices.

2. Description of Related Art

Portable storage devices, such as storage cards or external hard drives, are conventionally used for storing data and transmitting data among different electrical devices. However, a conventional portable device usually includes one data terminal only. Thus, when used for data transaction between different electric devices, the conventional portable device can connect to only one electrical device at a time. Convenience for the user is affected.

DETAILED DESCRIPTION

Figure 1:
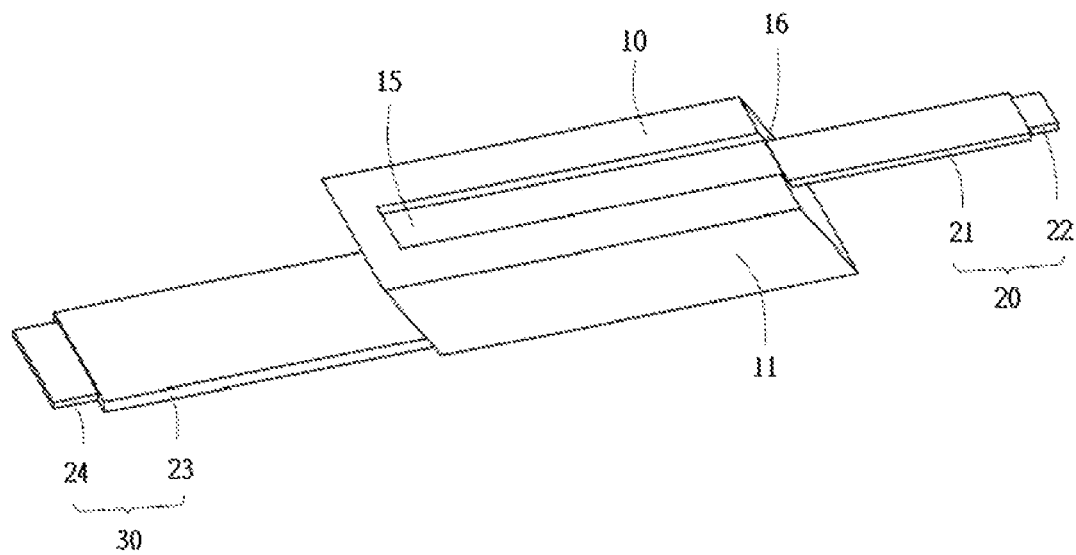
FIG. 1 is a view of one embodiment of a portable storage device.

FIG. 1 is a view of one embodiment of a portable storage device 100. The portable storage device 100 comprises a main body 10, a first connector 20 electrically coupled to the main body 10 and a second connector 30 electrically coupled to the main body 10. The first connector 20 and the second connector 30 are respectively capable of connecting to an electronic device. The main body 10 is capable of storing data transmitted from one electronic device to another. Thus, data can be transmitted among different electronic device.

The main body 10 comprises a case 11. The first connector 20 and the second connector 30 are disposed on the case 11. The first connector 20 and the second connector 30 are capable of being placed in the case 11. In one embodiment, the case 11 has a first surface and a second surface opposite thereto. The first connector 20 is disposed on the first surface and the second connector 30 is disposed on the second surface.

Figure 2:
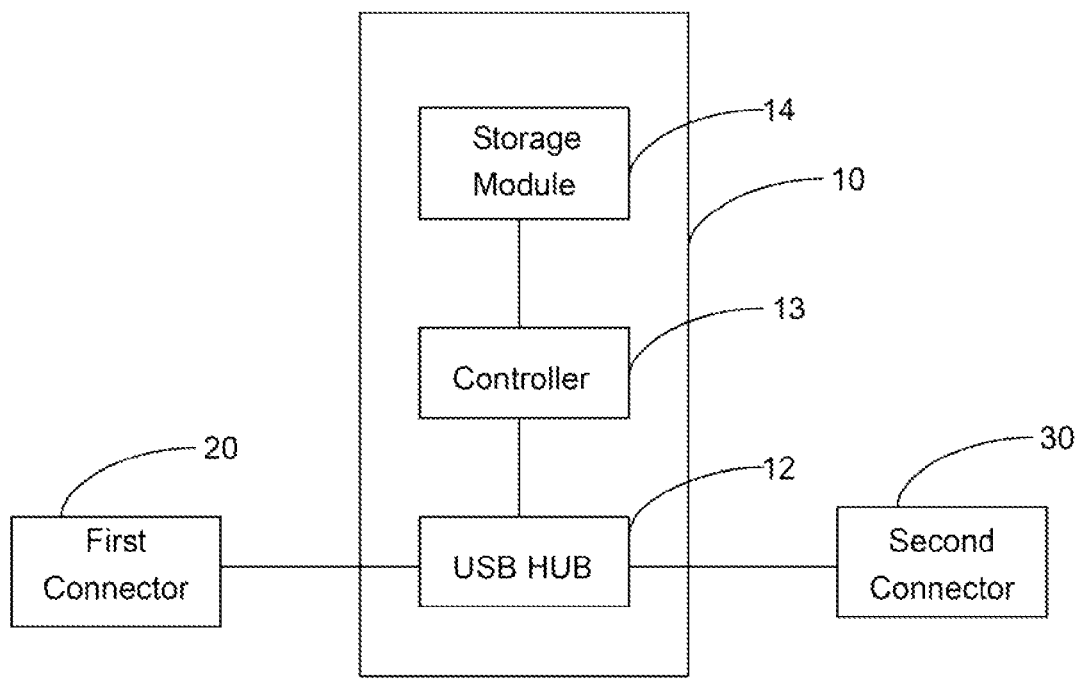
FIG. 2 is a block diagram of one embodiment of the portable storage device.

FIG. 2 is a block diagram of one embodiment of the portable storage device 100. The portable storage device 10 further comprises a USB hub 12, a controller 13 and a storage module 14, the first chamber 15, the second chamber 16, a first connector 20 and a second connector 30 in electrical communication with each other. The USB hub 12 is electrically connected with the first connector 20 and the second connector 30 respectively to distribute data flow. The controller 13 is capable of transmitting data from an electrical device connecting with the first connector 20 to the storage module 14 through the USB hub 12. The portable storage device 10 is also capable of transmitting data between the electrical device connecting with the first connector 20 and the other electrical device connecting with the second connector 30.

In FIG. 1, the first connector 20 further comprises a first portion 21, a first terminal 22 disposed at one end of the first portion 21, a second portion 23 opposite to the first portion 21 and a second terminal 24 disposed at one end of the second portion 23. The first portion 21 is made of a flexible material such that the first portion 21 is capable of rotating relative to the body of the portable storage device 10. In one embodiment, the first terminal 22 can be a USB type-A connector defined in USB specification for connecting a computer.

The second connector 30 comprises a third portion 31 and a third terminal 32 disposed at one end of the third portion 31. In one embodiment, the third terminal 32 can be a mini-USB connector for connecting with portable devices, such as mobile phone, PDA, or digital cameras, for example.

When the portable storage device 100 is in operation, the first connector 20 is capable of connecting to an electrical device such as a computer. Moreover, the second connector 30 is also capable of connecting to the other electrical devices, such as a mobile phone. Therefore, data communication and transmission between the mobile phone and the computer is possible through the portable device 100.

When the portable storage device 100 is not in operation, the first connector 20 and the second connector 130 are housed in the first chamber 15 and the second chamber 16 respectively so as to avoid unexpected damage.

In one embodiment, the inner walls of the first chamber 15 and the second chamber 16 are made of a magnetic material so as to fix the first connector 20 and the second connector 30 in the first chamber 15 and the second chamber 16 respectively. Moreover, the number of second connectors 30 can be more than one with each connector as disclosed connected with the USB hub 12. Thus, the connectors are capable of conducting data transmission among more than two electrical devices.

A first terminal 22 of is disposed at one end of the first portion, a second portion 23 of the portable storage device 100 is opposite to the first portion 21 and a second terminal 24 is disposed at one end of the second portion 23. The first portion 21 is made of a flexible material so that the first portion 21 is capable of rotating corresponding to the body of the portable storage device 10. In one embodiment, the first terminal 22 can be an type-A connector defined in USB specification for connecting a computer.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A portable storage device, comprising:
 a main body;
 a first connector, disposed on the main body, connecting with a first electronic device and transmitting data from the first electronic device; and
 a second connector, configured on the main body, connecting with a second electronic device and transmitting data from the second electronic device, wherein data is capable of being transmitted between the first electronic device and the second electronic device through the first connector and the second connector; wherein
 the main body further comprises a case, and the first connector and the second connector are configured on the case, and are adjustable to be stored into the case; wherein
 a first chamber and a second chamber configured on the case, the first chamber and the second chamber have magnetic parts to fix the first connector and the second connector respectively; wherein
 the main body further comprises a storage module, a controller and a USB hub electrically connecting with each other, the USB hub electrically connects with the first connector and the second connector.

2. The device of claim 1, wherein the first connector and the second connector are selected from a group of type-A USB connector and type-B USB connector.

3. The device of claim 1, wherein the case has a first surface and a second surface opposite to the first surface, the first chamber is configured on the first surface and the second surface is configured on the second surface.

4. The device of claim 1, wherein the first connector and the second connector are configured at opposite terminals of the case respectively.

* * * * *